(12) United States Patent
Michael

(10) Patent No.: US 11,668,855 B2
(45) Date of Patent: Jun. 6, 2023

(54) METHOD AND SYSTEM FOR SEDIMENTARY PATHWAY PREDICTION USING GEOLOGICAL AND SEISMIC DATA

(71) Applicant: SAUDI ARABIAN OIL COMPANY, Dhahran (SA)

(72) Inventor: Nikolaos A. Michael, Dhahran (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 370 days.

(21) Appl. No.: 16/899,035

(22) Filed: Jun. 11, 2020

(65) Prior Publication Data
US 2021/0389498 A1 Dec. 16, 2021

(51) Int. Cl.
*G01V 99/00* (2009.01)

(52) U.S. Cl.
CPC ...... *G01V 99/005* (2013.01); *G01V 2210/661* (2013.01)

(58) Field of Classification Search
CPC ...... G01V 99/005; G01V 1/306; G01V 1/282; G01V 11/00; G01V 2210/66; G01V 1/50; G01V 2210/6169; G01V 2210/661; G01V 1/30; G01V 2210/624; G01V 1/301; G01V 1/28; G01V 2210/665; G01V 3/38; G01V 2210/646; G01V 1/302; G01V 99/00; G01V 2210/663; G01V 2210/614; G01V 1/307; G01V 1/308; G01V 1/345; G01V 2210/6163; G01V 2210/64;
(Continued)

(56) References Cited

U.S. PATENT DOCUMENTS

2002/0099504 A1* 7/2002 Cross ............... G01V 11/00
702/2
2007/0219725 A1 9/2007 Sun et al.
(Continued)

FOREIGN PATENT DOCUMENTS

WO 2011/062807 A1 5/2011
WO 2019/055565 A1 3/2019

OTHER PUBLICATIONS

Gao, Shu, and Michael Collins. "Net sediment transport patterns inferred from grain-size trends, based upon definition of "transport vectors"." Sedimentary Geology 81.1-2 (1992): 47-60. (Year: 1992).*
(Continued)

*Primary Examiner* — Yoshihisa Ishizuka
*Assistant Examiner* — Carter W Ferrell
(74) *Attorney, Agent, or Firm* — Osha Bergman Watanabe & Burton LLP

(57) ABSTRACT

A method may include obtaining geological data and seismic data regarding a geological region of interest, wherein the geological data includes grain size data. The method may further include determining a first set of sedimentary pathways using the grain size data. The method may further include determining a topographical surface for the geological region of interest using the seismic data or/and well data. The method may further include determining, by the computer processor, a second set of sedimentary pathways using the topographical surface. The method may further include generating various output sedimentary pathways based on a combination of the first set of sedimentary pathways and the second set of sedimentary pathways.

17 Claims, 11 Drawing Sheets

(58) Field of Classification Search
CPC .... G01V 2210/1429; G01V 1/00; G01V 1/48; E21B 49/00; E21B 2200/20; E21B 49/02; E21B 7/04; G06T 17/05; G06T 19/20; G06F 30/20; G06F 17/10; G06F 2111/10; G01N 33/24; G01N 15/00; G01N 19/00
See application file for complete search history.

(56) References Cited

U.S. PATENT DOCUMENTS

| | | | |
|---|---|---|---|
| 2009/0204377 A1 | 8/2009 | Van Wagoner et al. | |
| 2010/0332210 A1 | 12/2010 | Birdwell et al. | |
| 2011/0240310 A1* | 10/2011 | Sun | G01V 99/00 703/10 |
| 2011/0264430 A1* | 10/2011 | Tapscott | G01V 99/00 703/10 |
| 2013/0132047 A1 | 5/2013 | Granjeon | |
| 2016/0070829 A1* | 3/2016 | Sun | G01V 99/005 703/2 |
| 2017/0167254 A1* | 6/2017 | Fotland | G01V 99/005 |
| 2017/0178313 A1* | 6/2017 | Yang | G06T 7/0004 |
| 2018/0267205 A1* | 9/2018 | Harris | G01V 99/005 |
| 2018/0275312 A1 | 9/2018 | Falivene Aldea et al. | |
| 2019/0033477 A1 | 1/2019 | Michael et al. | |
| 2019/0196058 A1 | 6/2019 | Kumar et al. | |

OTHER PUBLICATIONS

Yamashita, Shota, Hajime Naruse, and Takeshi Nakajo. "Reconstruction of sediment-transport pathways on a modern microtidal coast by a new grain-size trend analysis method." Progress in Earth and Planetary Science 5.1 (2018): 1-18. (Year: 2018).*

Michael, Nikolas A. et al., "The Functioning of Sediment Routing Systems Using a Mass Balance Approach: Example from the Eocene of the Southern Pyrenees", The Journal of Geology, The University of Chicago, vol. 121, 2013, pp. 581-606 (26 pages).

Richards, Paul L. and Andrew J. Brenner, "Delineating Source Areas for Runoff in Depressional Landscapes: Implications for Hydrologic Modeling", J. Great Lakes Res., Internat. Assoc. Great Lakes Res., vol. 30, No. 1, 2004, pp. 9-21 (13 pages).

Allen, Philip A. et al., "The Qs problem: Sediment volumetric balance of proximal foreland basin system", Sedimentology:, International Association of Sedimentologists, vol. 60, 2013, pp. 102-130 (29 pages).

Allen, Philip A. and John R. Allen, "Decompaction", Basin Analysis: Principles and Applications to Petroleum Play Assessment, John Wiley & Sons, Ltd., 3rd Edition, 2013, pp. 551-554 (4 pages).

Whittaker, Alexander C. et al., "Decoding downstream trends in straligraphic grain size as a function of tectonic subsidence and sediment supply", GSA Bulletin, Geological Society of America, Jul./Aug. 2011, vol. 123, No. 7/8; 2011, pp. 1363-1382 (20 pages).

Hantschel, Dr. Thomas and Dr. Armin I. Kauerauf, "A: Compaction and Flow Parameter", Fundamentals of Basin and Petroleum Systems Modeling, Springer-Verlag, 2009, pp. 405-412 (8 pages).

"Hjulström curve", Wikipedia, Last edit: Sep. 16, 2018, Accessed: Jun. 11, 2020 (2 pages).

International Search Report and Written Opinion issued in corresponding International Patent Application No. PCT/US2020/057030, dated Mar. 9, 2021 (14 pages).

O. Falivene et al: "Automatic calibration of stratigraphic forward models for predicting reservoir presence in exploration", AAPG (American Association of Petroleum Geologists) Bulletin, vol. 98, No. 9, Sep. 1, 2014, pp. 1811-1835 (35 pages).

Arab Mohamed et al: "Coupling stratigraphic and petroleum system modeling tools in complex tectonic domains: case study in the North Algerian Offshore", Arabian Journal of Geosciences, Springer Berlin Heidelberg, Berlin/Heidelberg, vol. 9, No. 4, Mar. 31, 2016, pp. 1-32 (32 pages).

* cited by examiner

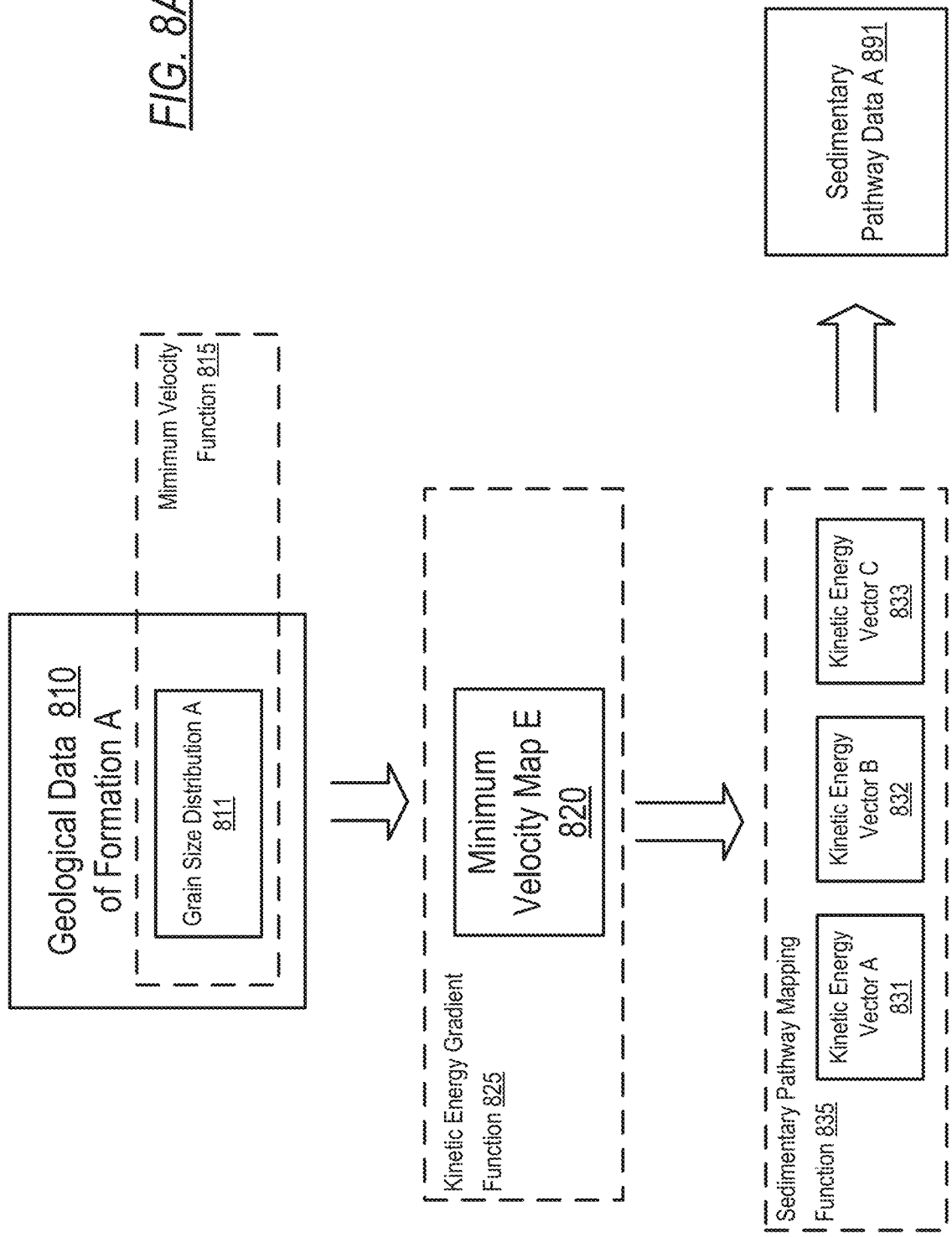

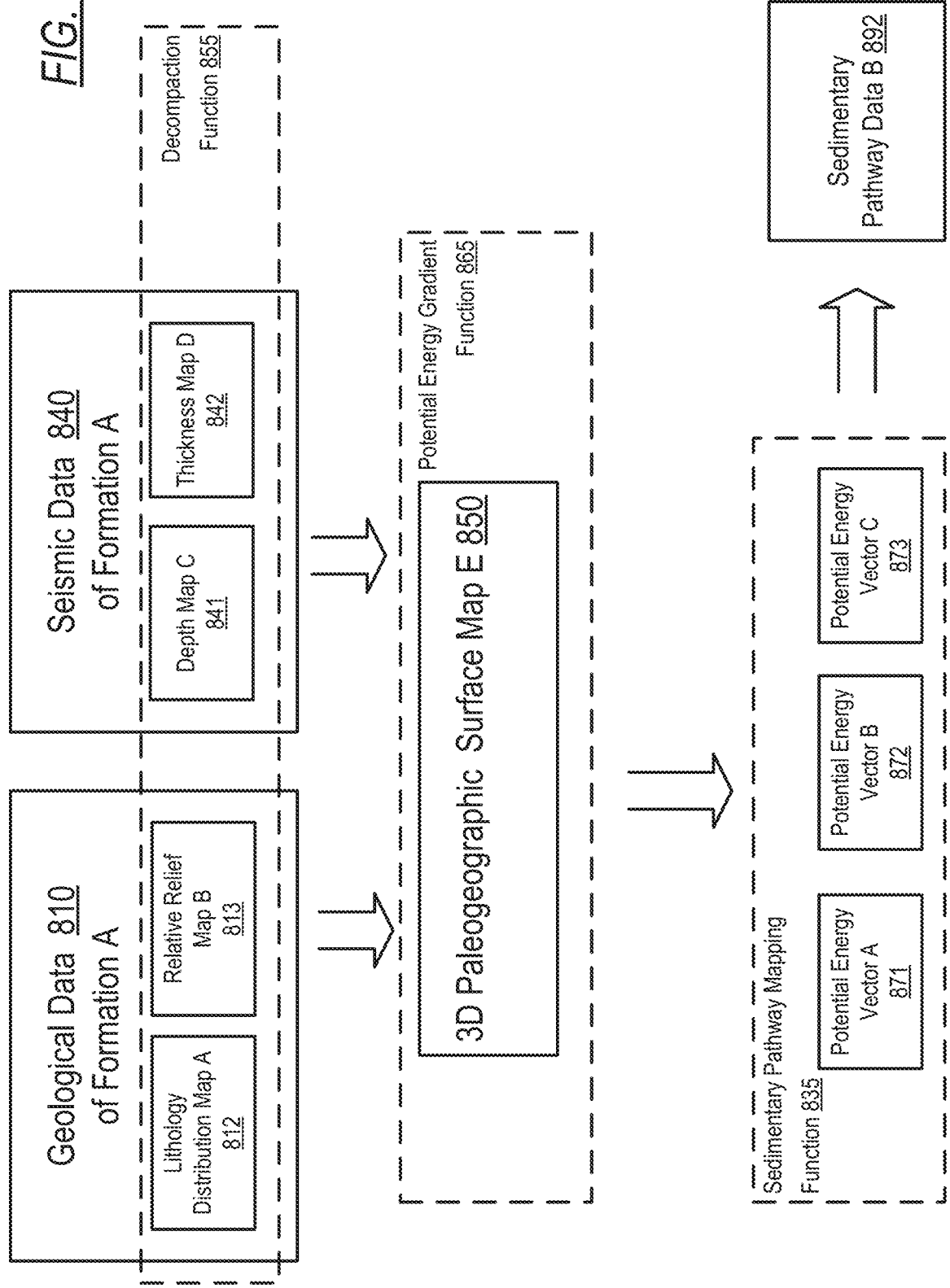

METHOD AND SYSTEM FOR SEDIMENTARY PATHWAY PREDICTION USING GEOLOGICAL AND SEISMIC DATA

BACKGROUND

In sedimentology, the evolution of ancient and modern sedimentary systems is studied. For example, sedimentology may determine vertical and lateral distributions of formations within the subsurface and resulting variability in space and time of sediments with specific features. This information may be used by various software programs in order to map geological formations in two dimensions or three dimensions as well as generate numerical models of sedimentary systems.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes obtaining, by a computer processor, geological data and seismic data regarding a geological region of interest, wherein the geological data includes grain size data. The method further includes determining, by the computer processor, a first set of sedimentary pathways using the grain size data. The method further includes determining, by the computer processor, a topographical surface for the geological region of interest using the seismic data or/and well data. The method further includes determining, by the computer processor, a second set of sedimentary pathways using the topographical surface. The method further includes generating, by the computer processor, various output sedimentary pathways based on a combination of the first set of sedimentary pathways and the second set of sedimentary pathways.

In general, in one aspect, embodiments relate to a system that includes a logging system coupled to various logging tools. The system further includes a reservoir simulator including a computer processor, where the reservoir simulator is coupled to the logging system. The reservoir simulator obtains geological data from the logging system and seismic data regarding a geological region of interest, where the geological data includes grain size data. The reservoir simulator further determines a first set of sedimentary pathways using the grain size data. The reservoir simulator further determines a topographical surface for the geological region of interest using the seismic data and/or well data. The reservoir simulator further determines a second set of sedimentary pathways using the topographical surface. The reservoir simulator further generates various output sedimentary pathways based on a combination of the first set of sedimentary pathways and the second set of sedimentary pathways.

In general, in one aspect, embodiments relate to a non-transitory computer readable medium storing instructions executable by a computer processor. The instructions obtain geological data from the logging system and seismic data regarding a geological region of interest, where the geological data includes grain size data. The instructions further determine a first set of sedimentary pathways using the grain size data. The instructions further determine a topographical surface for the geological region of interest using the seismic data and/or well data. The instructions further determine a second set of sedimentary pathways using the topographical surface. The instructions further generate various output sedimentary pathways based on a combination of the first set of sedimentary pathways and the second set of sedimentary pathways.

Other aspects of the disclosure will be apparent from the following description and the appended claims

BRIEF DESCRIPTION OF DRAWINGS

Specific embodiments of the disclosed technology will now be described in detail with reference to the accompanying figures. Like elements in the various figures are denoted by like reference numerals for consistency.

FIGS. 7A, 7B, 8A, 8B, and 8C show examples in accordance with one or more embodiments.

DETAILED DESCRIPTION

Figure 1:
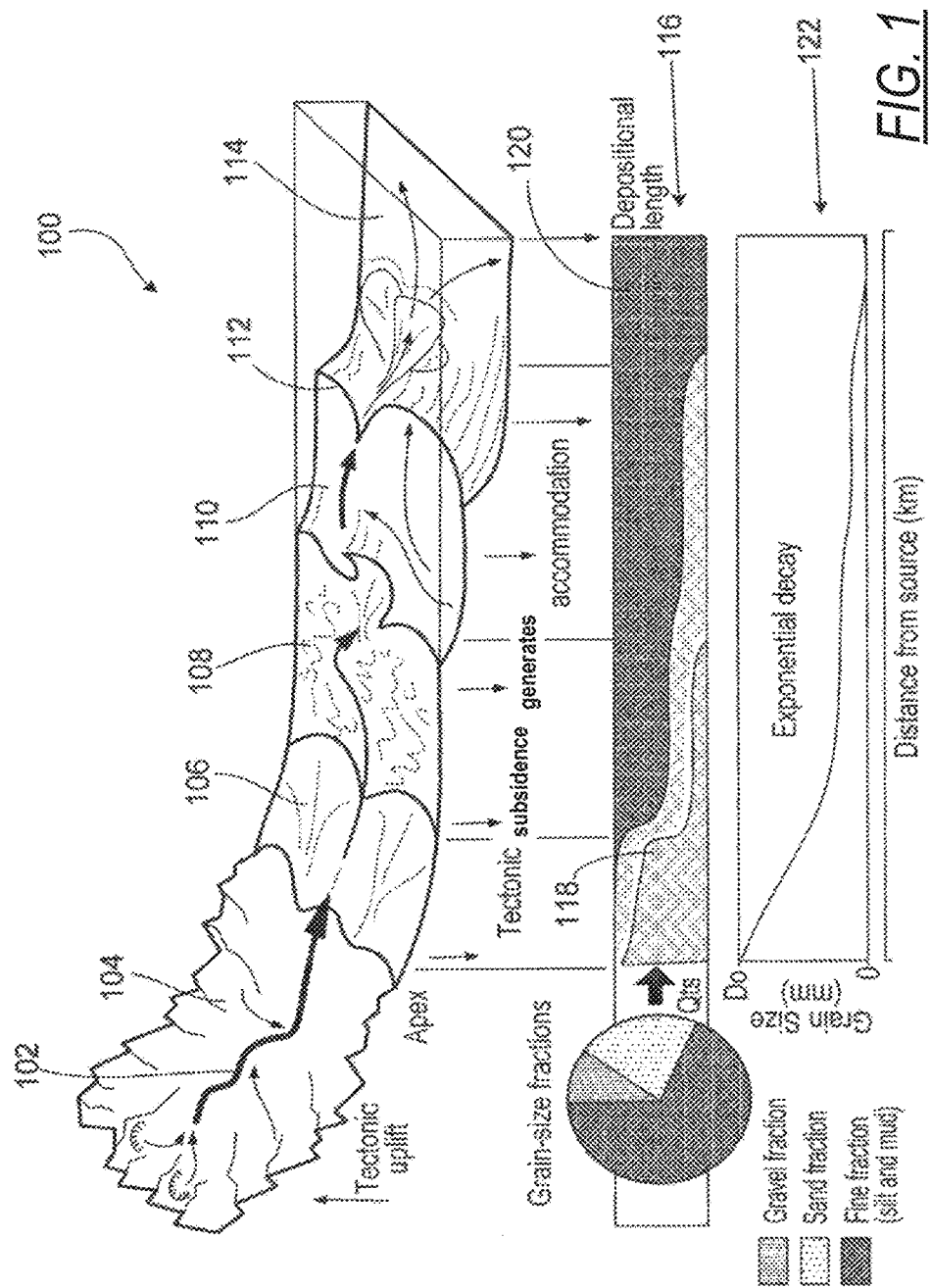
FIGS. 1, 2, and 3 show systems in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for using geological data and seismic data to determine different attributes for identifying sedimentary pathways within a geological region of interest. In particular, geological data and seismic data operate on different scales. For example, grain size data may describe geological properties at the millimeter level, while seismic data may describe spatial and geophysical properties with a kilometer scope. With grain size data, sediment velocity can be modelled in order determine a kinetic energy gradient field of a geological region of interest. This kinetic energy gradient field may then provide one mechanism for predicting a sedimentary pathway. With seismic or well data, a paleogeographic surface may be modeled that may describe a formation before undergoing sediment dispersal. From this paleogeographic surface, potential energy vectors may be determined for a geological region of interest in order to model sedimentary pathways based on gravity.

By integrating these two different techniques to predict sedimentary dispersion, a final output sedimentary pathway may be constructed accordingly. As such, identifying ancient sedimentary pathways may provide predictions in with respect to hydrocarbon deposits and ground water exploration. In some embodiments, for example, sedimentary pathway reconstruction and identification may predict reservoir quality and/or seal quality of a hydrocarbon trap.

Furthermore, some embodiments provide an automated workflow for a reservoir simulator to determine an output sedimentary pathway. For example, a sedimentary pathway prediction may include many data conversions between raw data and various maps that may be difficult to perform with a human analysis. By having a defined workflow using quantitative data as the inputs, sedimentary pathways may be determined quickly by a reservoir simulator accordingly.

Turning to FIG. 1, FIG. 1 illustrates a sedimentary system showing a progression of different grain types and grain sizes in a geologic region (100) in accordance with one or more embodiments. In particular, a sedimentary system may describe a sedimentary pathway from a sedimentary source location to a final sediment deposition. For reservoir simulations, sedimentary pathway data may form input parameters to comprehensive numerical modeling of sedimentary systems, e.g., forward depositional-diagenetic modelling.

In FIG. 1, the geologic region (100) includes a sedimentary pathway (102) that includes a variety of rock grains of various sizes, shapes, and types. The sedimentary pathway (102) starts at a catchment (104) and flows through a gravel alluvial fan (106), an alluvial plain (108), a coastal fence (110), and a shelf-slope break (112) before settling in a deep marine basin (114). Within this sedimentary pathway (102), different types of grains may be categorized according to different facies such as sand or fine-grain deposits. As the sedimentary pathway (102) passes through various zones, different-sized grains may get deposited along the sedimentary pathway and exit the load of sediment (102). In particular, the larger, heavier, and coarser sediment particles may depart from a sediment flow earlier than the smaller, lighter, finer sediment particles, such as sand. The sedimentary pathway (102) may have a sedimentary source that originates sedimentary particles for deposition along the sedimentary pathway (102).

Further, cross-section (116) illustrates an example division between gravel (118) and sand (120) as the sedimentary pathway (102) continues away from a sedimentary source. For example, the gravel alluvial fan (106) may include a greater total number of gravel-sized grains than the deep marine basin (114). In some cases, the average grain size may decrease according to an exponential-decay equation. In other words, the average grain size may exponentially decrease as the sedimentary pathway (102) continues away from the sedimentary source. In these instances, the exponential decay of the average grain size may be used to determine a sedimentary source location within the geological region (100).

Keeping with sedimentary pathways, a sedimentary source location may be determined using various techniques in accordance with one or more embodiments. For example, a grain size distribution of a geological region may be divided into a Cartesian grid, where each grid point may be a potential sedimentary source location. The grain size distribution may be based on geological data acquired from various well sources and analyzed accordingly. The geological data may include cuttings, core samples, well log data, and any other geological data representative of a formation or stratigraphic layer. As such, a grain size dataset may be generated that illustrates an average grain size for cells within a geological region's grid.

In some embodiments, a best-fit curve may be used to determine a sedimentary source location. The best-fit curve may be obtained from a plotted grain size dataset, where an initial sedimentary source location is within the best-fit curve. This initial sedimentary source location may be subsequently used to determine additional sedimentary sources within a geological region. More specifically, the distance to an additional sedimentary source may be used for each new fit to find the next best-fit source location that combines the initial sedimentary source with an additional sedimentary source. Likewise, the process may be repeated with additional grid points to determine additional sedimentary source locations. Thus, this identification process may be iterated multiple times to determine multiple sedimentary source locations using the minimum distance between source locations and the grid locations for individual wells. Until the goodness of fit of the best fit curve does not improve any more.

In some embodiments, regional sedimentary sources and local sedimentary source are determined. More specifically, regional sedimentary sources may be estimated by fitting sequentially average grain sizes with respect to distance from other grid points in the geological region. Likewise, local sedimentary sources may be determined by subdividing a geological region into sub-regions and fitting sequentially data correspond to a respective sub-region. For more information on determining sedimentary source locations, see U.S. Patent Application Publication No. 2019/0033477 A1, titled "Determining Sediment Source Locations", filed Aug. 7, 2017, which is incorporated by reference.

Figure 2:
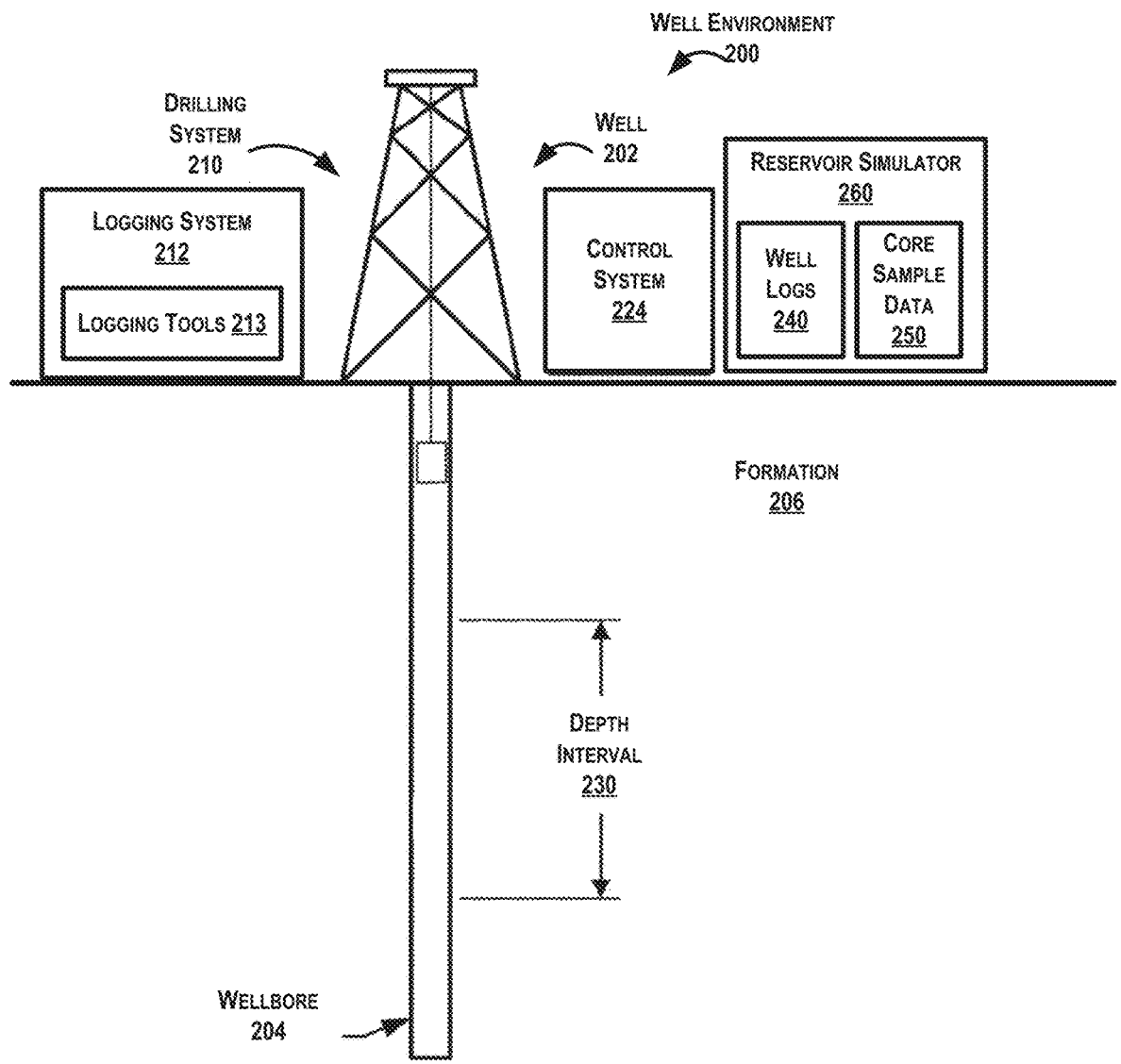

Turning to FIG. 2, FIG. 2 shows a schematic diagram in accordance with one or more embodiments. As shown in FIG. 2, FIG. 2 illustrates a well environment (200) that may include a well (202) having a wellbore (204) extending into a formation (206). The wellbore (204) may include a bored hole that extends from the surface into a target zone of the formation (206), such as a reservoir. The formation (206) may include various formation characteristics of interest, such as formation porosity, formation permeability, resistivity, water saturation, free water level (FWL), and the like. Porosity may indicate how much space exists in a particular rock within an area of interest in the formation (206), where oil, gas, and/or water may be trapped. Permeability may indicate the ability of liquids and gases to flow through the rock within the area of interest. Resistivity may indicate how strongly rock and/or fluid within the formation (206) opposes the flow of electrical current. For example, resistivity may be indicative of the porosity of the formation (206) and the presence of hydrocarbons. More specifically, resistivity may be relatively low for a formation that has high porosity and a large amount of water, and resistivity may be relatively high for a formation that has low porosity or includes a large amount of hydrocarbons. Water saturation may indicate the fraction of water in a given pore space.

Keeping with FIG. 2, the well environment (200) may include a drilling system (210), a logging system (212), a control system (214), and a reservoir simulator (260). The drilling system (210) may include a drill string, drill bit, a mud circulation system and/or the like for use in boring the wellbore (204) into the formation (206). The control system (214) may include hardware and/or software for managing drilling operations and/or maintenance operations. For example, the control system (214) may include one or more programmable logic controllers (PLCs) that include hardware and/or software with functionality to control one or more processes performed by the drilling system (210). Specifically, a programmable logic controller may control valve states, fluid levels, pipe pressures, warning alarms, and/or pressure releases throughout a drilling rig. In particular, a programmable logic controller may be a ruggedized computer system with functionality to withstand vibrations, extreme temperatures, wet conditions, and/or dusty conditions, for example, around a drilling rig. Without loss of generality, the term "control system" may refer to a drilling operation control system that is used to operate and control the equipment, a drilling data acquisition and monitoring system that is used to acquire drilling process and equipment data and to monitor the operation of the drilling process, or a drilling interpretation software system that is used to analyze and understand drilling events and progress.

Turning to the reservoir simulator (260), a reservoir simulator (260) may include hardware and/or software with functionality for storing and analyzing well logs (240), core sample data (250), seismic data, and/or other types of data to generate and/or update one or more geological models. While the reservoir simulator (260) is shown at a well site, in some embodiments, the reservoir simulator (260) may be remote from a well site. In some embodiments, the reservoir simulator (260) is implemented as part of a software platform for the control system (214). The software platform may obtain data acquired by the drilling system (210) and logging system (212) as inputs, which may include multiple data types from multiple sources. The software platform may aggregate the data from these systems (210, 112) in real time for rapid analysis. In some embodiments, the reservoir simulator (260) includes functionality for determining sedimentary pathways in accordance with the processes described below in FIGS. 4 and 6 and the accompanying description. In some embodiments, the control system (214), the logging system (212), and/or the reservoir simulator (260) may include a computer system that is similar to the computer system (900) described below with regard to FIG. 9 and the accompanying description.

The logging system (212) may include one or more logging tools (213), such as a nuclear magnetic resonance (NMR) logging tool and/or a resistivity logging tool, for use in generating well logs (240) of the formation (206). For example, a logging tool may be lowered into the wellbore (204) to acquire measurements as the tool traverses a depth interval (230) (e.g., a targeted reservoir section) of the wellbore (204). The plot of the logging measurements versus depth may be referred to as a "log" or "well log". Well logs (204) may provide depth measurements of the well (202) that describe such reservoir characteristics as formation porosity, formation permeability, resistivity, water saturation, and the like. The resulting logging measurements may be stored and/or processed, for example, by the control system (214), to generate corresponding well logs (240) for the well (202). A well log may include, for example, a plot of a logging response time versus true vertical depth (TVD) across the depth interval (230) of the wellbore (204).

Reservoir characteristics may be determined using a variety of different techniques. For example, certain reservoir characteristics can be determined via coring (e.g., physical extraction of rock samples) to produce core samples and/or logging operations (e.g., wireline logging, logging-while-drilling (LWD) and measurement-while-drilling (MWD)). Coring operations may include physically extracting a rock sample from a region of interest within the wellbore (204) for detailed laboratory analysis. For example, when drilling an oil or gas well, a coring bit may cut plugs (or "cores" or "core samples") from the formation (206) and bring the plugs to the surface, and these core samples may be analyzed at the surface (e.g., in a lab) to determine various characteristics of the formation (206) at the location where the sample was obtained.

Turning to various coring technique examples, conventional coring may include collecting a cylindrical sample of rock from the wellbore (204) using a core bit, a core barrel, and a core catcher. The core bit may have a hole in its center that allows the core bit to drill around a central cylinder of rock. Subsequently, the resulting core sample may be acquired by the core bit and disposed inside the core barrel. More specifically, the core barrel may include a special storage chamber within a coring tool for holding the core sample. Furthermore, the core catcher may provide a grip to the bottom of a core and, as tension is applied to the drill string, the rock under the core breaks away from the undrilled formation below coring tool. Thus, the core catcher may retain the core sample to avoid the core sample falling through the bottom of the drill string.

With respect to special coring techniques, coring may also be performed using a wireline-conveyed percussion sidewall coring or mechanically-drilled sidewall-coring techniques. For example, special coring techniques may be used where conventional coring techniques are unavailable or a special coring sample is required for a special analysis. In another example, a rotary-drilled sidewall coring technique may acquire undamaged core samples suitable for special core testing. Examples of special coring techniques may include using heavy duty conventional core barrels, disposable inner core barrels, core barrel lines, and/or a full-closure coring system. In particular, full-closure coring systems may be used for coring in an unconsolidated formation. More specifically, a full-closure coring system may use disposable inner barrels and/or inner barrel liners and a special core-catching system to retrieve soft cores during sample acquisition. Another special coring technique includes sponge coring. For example, a sponge coring tool may include a sponge sleeve or liner modification to an inner core barrel that is used in conventional coring. This sponge sleeve may be made of a tough porous polyurethane sponge, such that the sponge absorbs oil that bleeds from the core sample. The oil-wet sponge may hold oil tightly, while allowing water and gas to move through the sponge and out vent holes drilled in the aluminum liner.

In some embodiments, geological data is obtained from drill cuttings. For example, cuttings may include broken bits of solid material removed from a borehole drilled by rotary, percussion, or auger methods. For example, drill cuttings may be separated from liquid drilling fluid by shale shakers, by centrifuges, or by cyclone separators. In cable-tool drilling, the drill cuttings may be periodically removed from the bottom of a borehole. In auger drilling, cuttings may be carried to a well surface on auger flights. Cuttings may be monitored for composition, size, shape, color, texture, hydrocarbon content and other petrophysical properties. In some embodiments, cutting data may be used to determine a percentage of a particular lithology type in a formation. Drill cuttings may be used to generate a well log of subsurface materials penetrated at various depths in a borehole.

Turning to examples of logging techniques, multiple types of logging techniques are available for determining various reservoir characteristics. For example, nuclear magnetic resonance (NMR) logging measures the induced magnetic moment of hydrogen nuclei (i.e., protons) contained within the fluid-filled pore space of porous media (e.g., reservoir rocks). Thus, NMR logs may measure the magnetic response of fluids present in the pore spaces of the reservoir rocks. In so doing, NMR logs may measure both porosity and permeability, as well as the types of fluids present in the pore spaces. For determining permeability, another type of logging may be used that is called spontaneous potential (SP) logging. SP logging may determine the permeabilities of rocks in the formation (206) by measuring the amount of electrical current generated between drilling fluid produced by the drilling system (210) and formation water that is held in pore spaces of the reservoir rock. Porous sandstones with high permeabilities may generate more electricity than impermeable shales. Thus, SP logs may be used to identify sandstones from shales.

To determine porosity in the formation (206), various types of logging techniques may be used. For example, the logging system (212) may measure the speed that acoustic waves travel through rocks in the formation (206). This type of logging may generate borehole compensated (BHC) logs, which are also called sonic logs. In general, sound waves may travel faster through high-density shales than through lower-density sandstones. Likewise, density logging may also determine porosity measurements by directly measuring the density of the rocks in the formation (206). Furthermore, neutron logging may determine porosity measurements by assuming that the reservoir pore spaces within the formation (206) are filled with either water or oil and then measuring the amount of hydrogen atoms (i.e., neutrons) in the pores.

Keeping with the various types of logging techniques, resistivity logging may measure the electrical resistivity of rock or sediment in and around the wellbore (204). In particular, resistivity measurements may determine what types of fluids are present in the formation (206) by measuring how effective these rocks are at conducting electricity. Because fresh water and oil are poor conductors of electricity, they have high resistivities. As such, resistivity measurements obtained via such logging can be used to determine corresponding reservoir water saturation ($S_w$).

Another type of logging technique includes dielectric logging. For example, dielectric permittivity may be defined as a physical quantity that describes the propagation of an electromagnetic field through a dielectric medium. As such, dielectric permittivity may describe a physical medium's ability to polarize in response to an electromagnetic field, and thus reduce the total electric field inside the physical medium. In a portion of reservoir rock, water may have a large dielectric permittivity that is higher than any associated rock or hydrocarbon fluids within the portion. In particular, water permittivity may depend on a frequency of an electromagnetic wave, water pressure, water temperature, and salinity of the reservoir rock mixture.

Keeping with dielectric logging, a dielectric logging tool may determine a dielectric constant (i.e., relative-permittivity) measurement. For example, the dielectric logging tool may include an antenna that detects relative dielectric constants between different fluids at a fluid interface. As such, a dielectric logging tool may generate a dielectric log of the high-frequency dielectric properties of a formation. In particular, a dielectric log may include two curves, where one curve may describe the relative dielectric permittivity of the analyzed rock and the other curve may describe the resistivity of the analyzed rock. Relative dielectric permittivity may be used to distinguish hydrocarbons from water of differing salinities. However, the effect of salinity may be more important than the salinity effect with a high-frequency dielectric log (also called an "electromagnetic propagation log").

Figure 3:
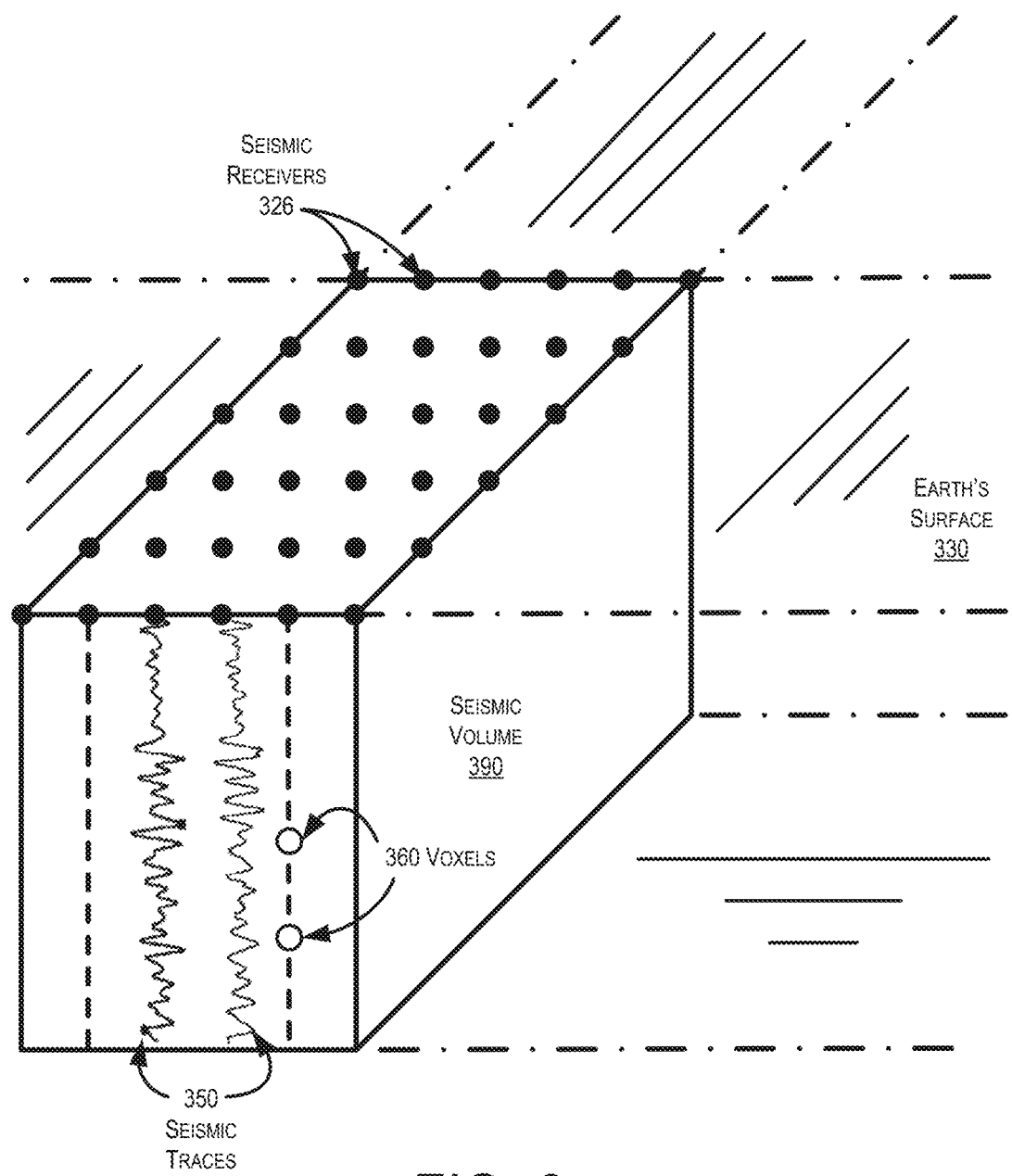

Turning to FIG. 3, FIG. 3 illustrates a system in accordance with one or more embodiments. As shown in FIG. 3, a seismic volume (390) is illustrated that includes various seismic traces (e.g., seismic traces (350)) acquired by various seismic receivers (e.g., seismic receivers (326)) disposed on the earth's surface (330). More specifically, a seismic volume (390) may be a three-dimensional cubic data set of seismic traces. Individual cubic cells within the seismic volume (390) may be referred to as voxels or volumetric pixels (e.g., voxels (360)). In particular, different portions of a seismic trace may correspond to various depth points within a volume of earth. To generate the seismic volume (390), a three-dimensional array of seismic receivers (326) are disposed along the earth's surface (330) and acquire seismic data in response to various pressure waves emitted by seismic sources. Within the voxels (360), statistics may be calculated on first break data that is assigned to a particular voxel to determine multimodal distributions of wave travel times and derive travel time estimates (e.g., according to mean, median, mode, standard deviation, kurtosis, and other suitable statistical accuracy analytical measures) related to azimuthal sectors. First break data may describe the onset arrival of refracted waves or diving waves at the seismic receivers (326) as produced by a particular seismic source signal generation.

Seismic data may refer to time domain data acquired from a seismic survey (e.g., acquired seismic data may result in the seismic volume (390)). However, seismic data may also refer to data acquired over different periods of time, such as in cases where seismic surveys are repeated to obtain time-lapse data. Seismic data may also refer to various seismic attributes derived in response to processing acquired seismic data. Furthermore, in some embodiments, seismic data may also refer to depth data. For example, seismic data may be processed, e.g., using a seismic inversion operation, to generate a velocity model of a subterranean formation, or a migrated seismic image of a rock formation within the earth's surface.

While seismic traces with zero offset are generally illustrated in FIG. 3, seismic traces may be stacked, migrated and/or used to generate an attribute volume derived from the underlying seismic traces. For example, an attribute volume may be a dataset where the seismic volume undergoes one or more processing techniques, such as amplitude-versus-offset (AVO) processing. In AVO processing, seismic data may be classified based on reflected amplitude variations due to the presence of hydrocarbon accumulations in a subsurface formation. With an AVO approach, seismic attributes of a subsurface interface may be determined from the dependence of the detected amplitude of seismic reflections on the angle of incidence of the seismic energy. This AVO processing may determine both a normal incidence coefficient of a seismic reflection, and/or a gradient component of the seismic reflection. Likewise, seismic data may be processed according to a pressure wave's apex. In particular, the apex may serve as a data gather point to sort first break picks for seismic data records or traces into offset bins based on the survey dimensional data (e.g., the x-y locations of the seismic receivers (326) on the earth surface (330)). The bins may include different numbers of traces and/or different coordinate dimensions.

While FIGS. 2 and 3 show various configurations of components, other configurations may be used without departing from the scope of the disclosure. For example, various components in FIGS. 2 and 3 may be combined to create a single component. As another example, the functionality performed by a single component may be performed by two or more components.

Figure 4:
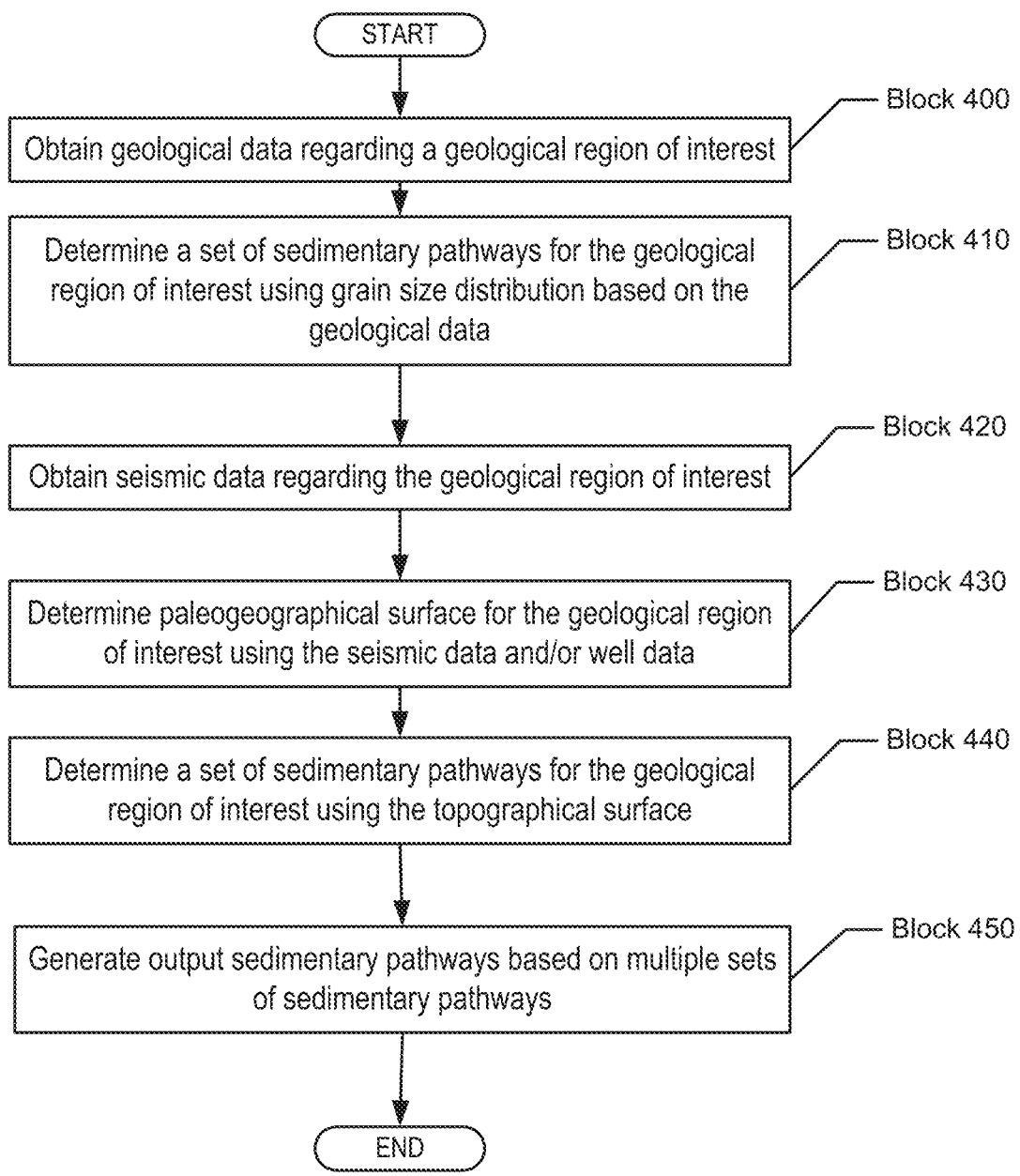
FIG. 4 shows a flowchart in accordance with one or more embodiments.

Turning to FIG. 4, FIG. 4 shows a flowchart in accordance with one or more embodiments. Specifically, FIG. 4 describes a general method for determining output sedimentary pathways. One or more blocks in FIG. 4 may be performed by one or more components (e.g., reservoir simulator (260)) as described in FIGS. 2 and/or 3. While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 400, geological data are obtained regarding a geological region of interest in accordance with one or more embodiments. A geological region of interest may be a portion of a geological area or volume that includes one or more formations of interest desired or selected for analysis, e.g., for determining location of hydrocarbons or reservoir development purposes. In some embodiments, geological data may be based on subsurface data, surface data, and/or outcropping data.

In another embodiment, geological data may include well data that is pre-processed to determine lithological information. As such, geological data may specify the percentage of various lithofacies acquired from various wells in the geological region of interest. Thus, geological data may include a lithology classification from cuttings or petrophysical properties from various wells. Such lithology classifications may correspond to various bins of different lithology types, where a percentage of a particular lithology type is estimated for a formation of interest in the geological region. In regard to ancient siliciclastic sedimentary pathways, for example, the geological data may identify siliciclastic lithofacies.

In some embodiments, the geological data corresponds to point data within a grid having x and y coordinates with various geological attributes, e.g., lithology percentages for a predefined area of a geological region. In another embodiment, the geological data may include a qualitative gross depositional environment map (GDE).

In some embodiments, the geological data includes a grain size distribution based on averaged grain size data of various areas in a geological region. For example, the average grain size at a particular well may be calculated for various lithology classes by multiplying the respective grain size for each lithology classes by their percentage within a particular location. The average grain sizes for the lithology classes may then be summed in order to determine the average grain size at a particular location. In some embodiments, the average grain size for a location may be determined using the following equation:

$$GS = shale \times 0.0039 + Silt \times 0.0625 + \text{very fine sand} \times 0.125 + \text{fine sand} \times 0.25 + \text{medium sand } 0.5 + \text{coarse sand} \times 1.0 + \text{very coarse sand} \times 2.0 + \text{pebble} \times 4.0 \quad \text{Equation 1}$$

where GS corresponds to an average grain size in millimeters, and shale, silt, very fine sand, fine sand, medium sand, coarse sand, and very coarse sand correspond to percentages of different lithological classes. While Equation 1 is one example of a model for determining an average grain size from lithological information, other models are contemplated as well using core sample data, seismic data, and/or petrophysical data.

In Block 410, a set of sedimentary pathways is determined for a geological region of interest using a grain size distribution based on geological data in accordance with one or more embodiments. For example, grain size data may be disposed within a grid and interpolated between various wells to produce a grain size distribution for a geological region of interest.

To be compared to energy, force or height, the grain size distribution may be converted into a minimum velocity attribute using one or more models. For example, this minimum velocity attribute may provide a measure of the kinetic energy required to move a sediment particle from a sedimentary source to the sediment's present location along a historic sedimentary pathway. In particular, different energy types contribute to sediment dispersal, such as wind and marine currents. Example sediment dispersal processes may include weathering, erosion, crystallization, deposition, etc. As such, a minimum velocity attribute may describe these various energies and their corresponding sediment dispersal processes.

In some embodiments, various models are used to determine the velocity attribute from geological data. For example, different velocity attributes may be used depending on the type of depositional environment. In one embodiment, for example, a reservoir simulator may use a Hjulström curve or a Hjulström-Sundborg Diagram to determine the velocity attribute from grain size data.

In Block 420, seismic data are obtained regarding a geological region of interest in accordance with one or more embodiments. For example, a seismic survey may be performed to acquire seismic data using seismic receivers and seismic sources. The seismic data may be similar to the seismic data, such as seismic volume (390) described above in FIG. 3 and the accompanying description.

In some embodiments, the seismic data is processed using lithology and petrophysical attributes from geological data, such as to perform seismic inversion. Accordingly, seismic data may provide a structural and spatial framework along with geophysical attributes of formations within the geological region of interest. In some embodiments, seismic data may be processed to obtain a depth map and a thickness map of one or more formations and approximations of lithology distributions in the geological region of interest.

In Block 430, a paleogeographical surface is determined for a geological region of interest using seismic data in accordance with one or more embodiments. For example, a paleogeographical surface may be a topographical surface associated with a particular geological time period. As such, a reservoir simulator may determine a paleogeographical surface using a decompaction process. A decompaction process may describe various operations for restoring subsurface formations to their respective thickness at the time of sedimentary deposition. In some embodiments, a paleogeographical surface is reconstructed based on the following inputs: 1) depth maps, 2) thickness maps of the geological region of interest, 3) a lithology distribution map, and 4) a relative relief map from a qualitative gross depositional environment map (GDE) based on core and analogue data (see FIG. 5 and the accompanying description below for an example of reconstructing a paleogeographical surface).

A depth map may describe a location of a particular formation within the subsurface, such as in relation to various stratigraphic layers, other formations, or by specific depth value of a formation top. A thickness map may describe the vertical distance between different sides of a formation. A lithology distribution map may describe various lithology types within a formation as well as lithology types associated with neighboring formations or stratigraphic layers. Lithology distributions may be determined from geological data acquired from subsurface wells or through seismic inversion techniques. A relative relief map may describe the surface terrain at the time period selected for the paleogeographic surface. A depth map, a thickness map, a lithology distribution map, and a relief map may be determined from seismic data and/or geological well data. For example, seismic data may provide a spatial mapping of the subsurface, which may then be calibrated using geological data. While seismic data may be smoother and more continuous than well data, a reservoir simulator may use well data in place of seismic data to determine a paleogeographic surface. However, the resulting paleogeographic surface may not be as accurate as one based on seismic data. Thus, the process in FIG. 4 may also be performed without seismic data in some embodiments.

Figure 5:
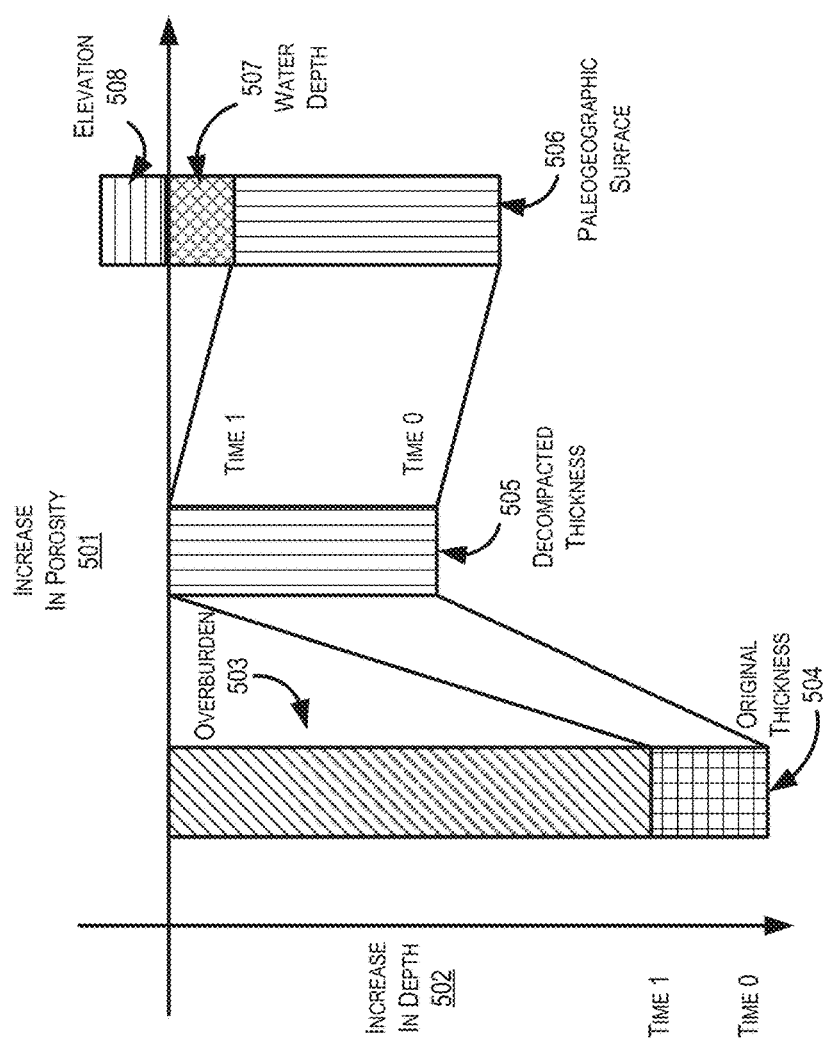
FIG. 5 shows an example in accordance with one or more embodiments.

In some embodiments, a decompaction process may illustrate changes in a formations along a porosity versus depth curve. For example, FIG. 5 illustrates a decompaction process where an original thickness is acquired for a formation below an overburden. The original thickness is subsequently transformed into a decompacted thickness during the decompaction process. Finally, an additional relief is added to the decompacted thickness using a relief map for the respective time period of the paleogeographic surface.

Turning to FIG. 5, FIG. 5 illustrates a diagram of a decompaction process that includes an axis (501) that shows an increase in porosity and another axis (502) that shows an increase in depth in regard to a geological formation from time 0 to time 1. In particular, the diagram illustrates the original thickness (504) of a formation with an overburden (503). Using the decompaction process, the original thickness (504) is transformed into a corresponding decompacted thickness (505). Finally, a paleogeographic surface (506) is generated that is located with respect to a water depth (507) and an elevation (508).

In Block 440, a set of sedimentary pathways is determined for a geological region of interest using a paleogeographic surface in accordance with one or more embodiments. Following a paleogeographic reconstruction process, for example, topographical gradients may be determined accordingly. These topographical gradients may describe sedimentary dispersal trends based on gravity, which may be transformed to determine potential energy values. Where Block 410 analyzed sedimentary dispersal processes using grain sizes, Block 440 may determine a potential energy attribute that describes the sedimentary dispersal using only gravity in the absence of these other energies. The result of this potential energy attribute may be to produce a gradient-based sedimentary pathway that illustrates where gravity move sediment particles. As such, a gradient-based sedimentary pathway may not match a sedimentary pathway based on grain sizes. If gravity was the main energy driving a sedimentary pathway, the two types of sedimentary pathways may have the same paleocurrent direction. For more information on generating sedimentary pathways using topographical gradients, see FIGS. 6, 7, and 8B below and the accompanying description.

In Block 450, various output sedimentary pathways are determined based on multiple sets of sedimentary pathways in accordance with one or more embodiments. An output sedimentary pathway may model a sedimentary dispersal for a particular time period that produced one or more formations within the geological region of interest. In some embodiments, for example, sedimentary pathways based on grain size are combined with sedimentary pathways based on potential energy to generate output sedimentary pathways. Rather than using only a single sedimentary path type, multiple types may be integrated to produce a sedimentary system for a geological region of interest. Thus, the output sedimentary pathway may provide an ancient gradient field describing a combined gradient of various energies.

Figure 7A:
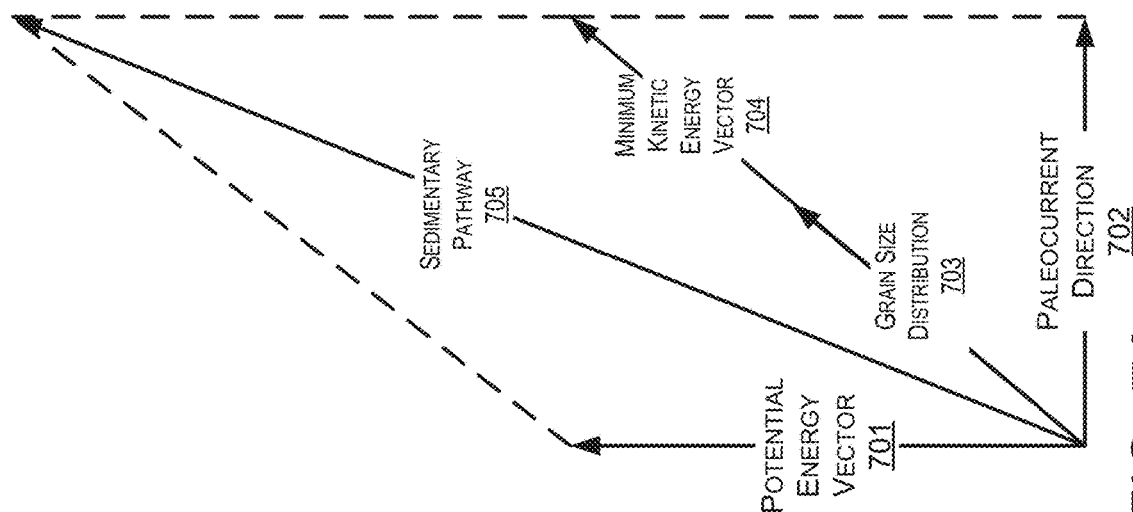
Figure 7B:
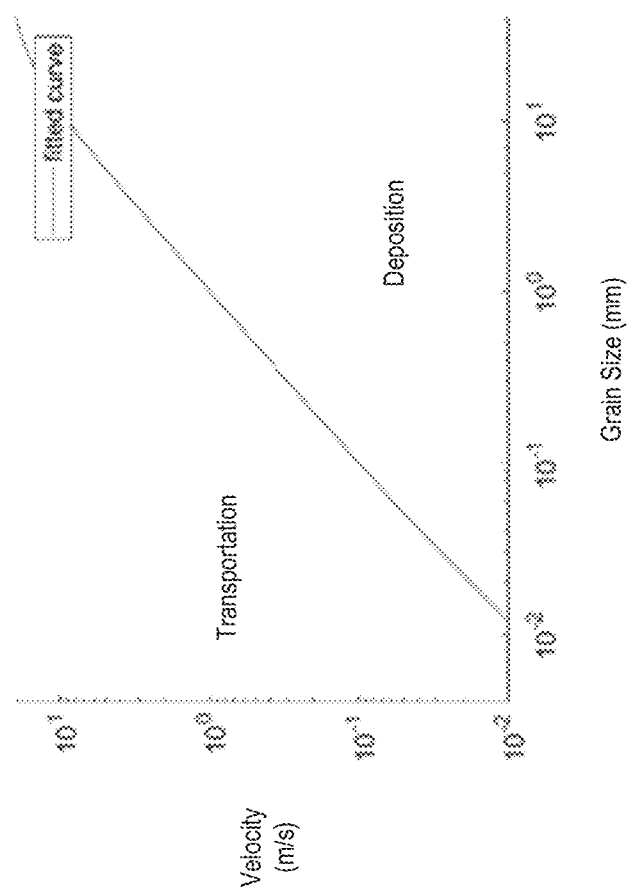

Turning to FIG. 7A, FIG. 7A illustrates a generation of an output sedimentary pathway in accordance with one or more embodiments. As shown in FIG. 7A, an output sedimentary pathway ($\vec{S}_{GT}$) (705) is the summation of a potential energy vector ($\vec{T}$) (701) and a minimum kinetic energy vector ($\vec{Gs}$) (704). For example, a reservoir simulator may perform a transformation of a topographic gradient to produce the potential energy vector ($\vec{T}$) (701), while also performing a transformation of grain size distribution (703) to produce a minimum kinetic energy vector ($\vec{Gs}$) (704). By combining a minimum kinetic energy vector (704) and a potential energy vector (701), an output sedimentary pathway ($\vec{S}_{GT}$) (705) may be reconstructed accordingly. Likewise, a palaeocurrent direction ($\vec{C}_d$) (702) of the output sedimentary pathway may correspond to the difference between the output sedimentary pathway (705) and the corresponding potential energy vector (701).

Figure 6:
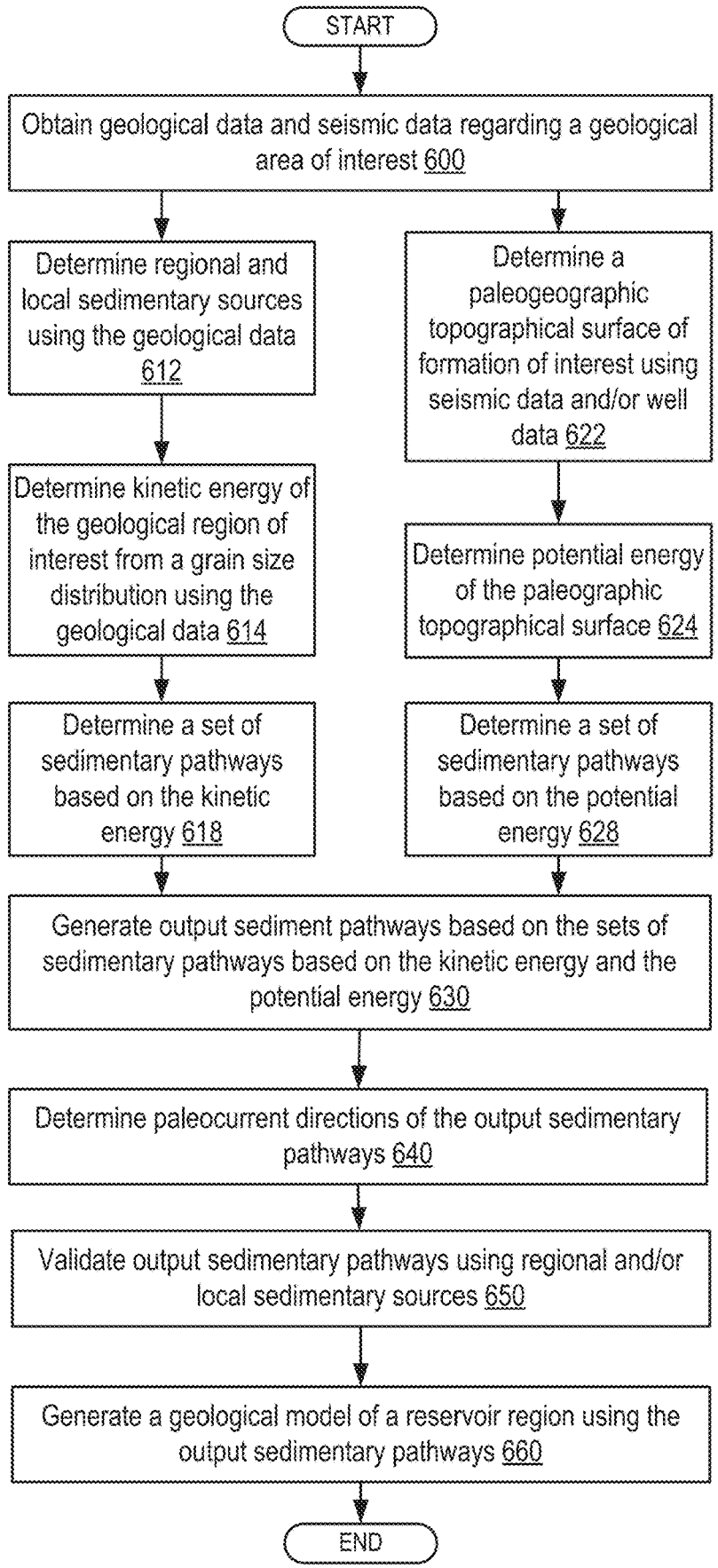
FIG. 6 shows a flowchart in accordance with one or more embodiments.

Turning to FIG. 6, FIG. 6 shows a flowchart in accordance with one or more embodiments. Specifically, FIG. 6 describes a specific method for using output sedimentary pathways to determine a geological model and/or perform various applications. One or more blocks in FIG. 6 may be performed by one or more components (e.g., reservoir simulator (260)) as described in FIGS. 2 and/or 3. While the various blocks in FIG. 6 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 600, geological data and seismic data are obtained regarding a geological region of interest in accordance with one or more embodiments. For example, geological data may be obtained in a similar manner as described above in Block 400 in FIG. 4 and the accompanying description. Likewise, seismic data may be obtained in a similar manner as described above in Block 420 in FIG. 4 and the accompanying description.

In Blocks 612-618 below, a process is described for determining a set of sedimentary pathways based on kinetic energy calculations. In Blocks 622-628 below, a separate process is described for determining a different set of sedimentary pathways.

Turning to Block 612, regional and/or local sedimentary sources are determined using geological data in accordance with one or more embodiments. To determine a local sedimentary source, a geological region of interest may be divided into various sub-regions. In particular, the size of a sub-region may be a fraction of the geological region of interest. Sizes of sub-regions may be a predetermined value depending on computational resources, e.g., for a simulation. In one embodiment, multiple sizes of sub-regions may be used that range from 5% to 50% of the geological region of interest. Some embodiments include sub-regions that overlap. Thus, the size of a sub-region may define the grain size data for curve fitting. A sub-region may also have a predetermined number of wells to have a particular amount of corresponding geological data. In some embodiments, a local sedimentary source is the source for a sub-region, while a regional sedimentary source is the source for multiple sub-regions or the geological region of interest. In one embodiment, for example, a regional sedimentary source may be located outside the geological region of interest. Once the geological region of interest is divided into sub-regions accordingly, local sedimentary sources and regional sedimentary sources may be determined in a similar manner as described above with respect to FIG. 1 and the accompanying description. The source location that satisfies a fit of a particular grain size dataset may be assigned the sedimentary source location for the respective region.

In some embodiments, various algorithms are used to determine sedimentary source locations, such as single exponential decay algorithms, double exponential decays algorithms, and/or linear fit algorithms. In some embodiments, a determination of local sedimentary sources and regional sedimentary sources provides a quality control step for validating output sedimentary pathways and/or paleocurrent directions. For more information on validating output sedimentary pathways and paleocurrent directions, see Block 650 below and the accompanying description.

While Block 612 is shown after Block 600 in the process described in FIG. 6, determining regional and source sedimentary locations may be performed independently of the workflows for generating output sedimentary pathways in Block 630 below. Accordingly, Block 612 may be performed before or after Block 630.

In Block 614, kinetic energy is determined from a grain size distribution using geological data in accordance with one or more embodiments. Using Equation 1 described above, for example, geological data may be used to calculate the average grain size for a location point within a geological region of interest. This grain size information may be inserted within cells in a grid and interpolated between well sources in order to produce a minimum velocity grid or velocity map. From a minimum velocity grid, kinetic energy may be determined from the following equation:

$$E_k = \tfrac{1}{2} * m * V^2 \qquad \text{Equation 2}$$

where $E_k$ is an amount of kinetic energy, m is the amount of mass of sediment at a grid location, and V is the minimum velocity for achieving a predetermined sediment dispersal that corresponds to a cell within a minimum velocity grid. In particular, an average grain size may be obtained at a particular grid location, which may be followed by a transformation of the grain size to a minimum velocity using Equation 2. For an example of this transformation of grain size data to minimum velocity data, see FIG. 7B. In this way, a change in grain size may be converted to changes in minimum kinetic energy for sediment particles. Thus, a reservoir simulator may use the minimum kinetic energy grid to determine kinetic energy gradient vectors that describe differences within the kinetic energy field in the geological region of interest. Accordingly, a kinetic energy gradient vector may be transformed into a kinetic energy vector.

In Block 618, a set of sedimentary pathways is determined for a geological region of interest based on kinetic energy in accordance with one or more embodiments. Using kinetic energy vectors, a reservoir simulator may generate a sedimentary map that illustrates apparent sedimentary pathways within a geological region of interest. Thus, a kinetic energy vector may have both a magnitude and directional component that identifies a sedimentary dispersion process within a portion of the geological region of interest.

In Block 622, a paleogeographic surface of a formation of interest is determined using seismic data in accordance with one or more embodiments. A paleogeographic surface may be determined in a similar manner as described above in Block 430 in FIG. 4 and the accompanying description.

In Block 624, potential energy is determined from a paleogeographic surface in accordance with one or more embodiments. For example, a geological region of interest may be divided into a grid, where one or more decompaction processes are applied to individual cells within the grid. In particular, different cells may include values for thickness of one or more formations, the depth of the formations, and different lithology types. In some embodiments, for example, the following equation is used to determine a decompacted thickness for a respective cell:

$$y2' = y2 - y1 - \frac{phi_0}{c_0}[\exp(-c_0 * y1) - \exp(-c_0 * y2)] + \frac{phi_0}{c_0}[\exp(-c_0 * y1') - \exp(-c_0 * y2')] \qquad \text{Equation 3}$$

where y2' is the thickness of a decompacted formation, y1'=0 corresponds to a value of the decompacted formation at the surface, y1 is the depth of an original formation's top at the surface, and y2 is the base of the original formation within the subsurface. Further, $phi_0$ and $C_0$ may be parameters of the lithologic type of the formation within a respective cell of the geological region of interest. For example, $phi_0$ may be the initial porosity for the formation's lithology and $C_0$ is the porosity reduction or decay rate that is specific for the corresponding grain size. Thus, a $phi_0$ is an initial porosity measurement, and $C_0$ is a coefficient and reduction rate of porosity with depth in the Equation 3. After determining a decompacted thickness of a formation, a relative relief map may be added to the resulting topographical surface in order to produce a final 3D digital paleogeographic surface.

To determine a potential energy gradient from the paleogeographic surface, a difference is determined between a topographic height between neighboring cells within the geological region of interest. For example, the gradient field may be determined for the x-direction and y-direction and thus potential energy between adjacent cells corresponding to a geological region of interest. In some embodiments, for example, potential energy may be expressed using the following equation:

$$PE = m * g * Dh \qquad \text{Equation 4}$$

where in is a mass of sediment (e.g., 1 kg), g is 9.81 m/s², and Dh is the topographic gradient between two points within the geological region of interest. Thus, Equation 4 may provide a computation for a potential energy vector.

In Block 628, a set of sedimentary pathways is determined based on potential energy in accordance with one or more embodiments. Using potential energy vectors, for example, a sedimentary pathway may be determined using various methods, such as a least resistance path towards a low point of a topographic surface.

In Block 630, output sedimentary pathways are generated based on sets of sedimentary pathways based on kinetic energy and potential energy in accordance with one or more embodiments. As shown in FIG. 5, for example, a vector corresponding to an output sedimentary pathway may be determined using the following equation:

$$\vec{S}_{GT} = \vec{Gs} + \vec{T} \qquad \text{Equation 5}$$

where Equation 5 is described in more detail above in FIG. 7A and the accompanying description.

In Block 640, various paleocurrent directions are determined from output sedimentary pathways in accordance with one or more embodiments. A palaeocurrent direction may be a vector that shows to what extent ancient grain size trends deviate from syndepositional topographic gradient trends. In particular, a palaeocurrent direction may be the difference between a potential energy vector and an output sedimentary pathway.

In Block 650, output sedimentary pathways are validated using regional sedimentary sources and/or local sedimentary sources in accordance with one or more embodiments. In particular, generating output sedimentary pathways and determining sedimentary source locations may be independent methodologies, which may match where both methodologies accurately model the historical paleogeographic surface. In some embodiments, an output sedimentary pathway may be extended beyond a geological region of interest in order to construct a regional sedimentary pathway, e.g., where topographical data or seismic data is not available.

For validating the output sedimentary pathways, the entry points of an output sedimentary pathway may be compared to the local and regional sedimentary sources described above in FIG. 1 and Block 612 and the accompanying description. Where a match occurs, this may provide a confirmation that the output sedimentary pathways are accurate. Where a disagreement exists between sedimentary source location parameters and output sedimentary pathway, various inputs for producing the kinetic energy vectors and/or the potential energy vectors may be modified and the process in Blocks 600-630 may be repeated. In some embodiments, the connecting algorithm in Block 630 may be modified for combining sedimentary pathways based on kinetic energy and sedimentary pathways based on potential energy.

In Block 660, a geological model of a reservoir region is generated using various output sedimentary pathways in accordance with one or more embodiments. Output sedimentary pathways may be integrated into a geological model that models a hydrocarbon-bearing reservoir region. For example, locations within a geological model that are closer to a sedimentary source location may have better reservoir quality. Likewise, locations in the geological model away from a sedimentary pathway or sedimentary source location may have lower hydrocarbon-producing potential and better seal potential.

Figure 8C:
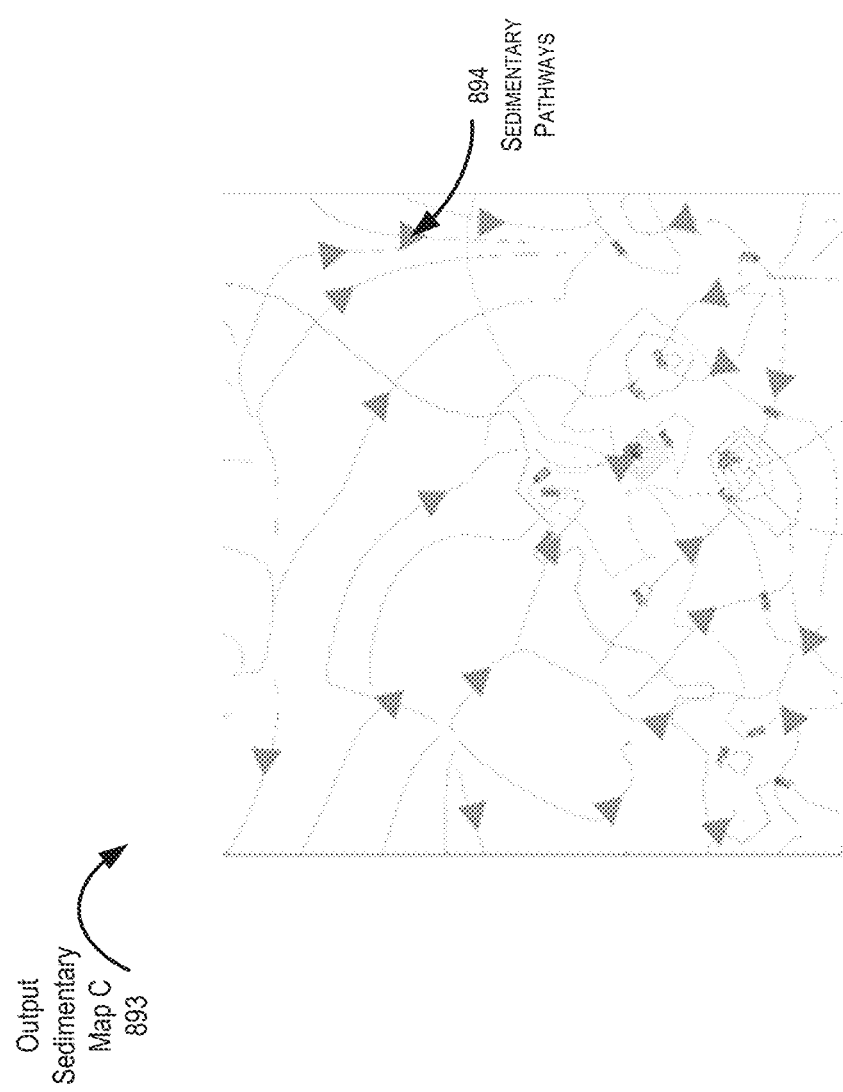

Turning to FIGS. 8A, 8B and 8C, FIGS. 8A, 8B, and 8C provide an example of producing an output sedimentary pathway map. The following example is for explanatory purposes only and not intended to limit the scope of the disclosed technology. In FIG. 8A, a reservoir simulator (not shown) includes geological data of a formation A (810) with a grain size distribution A (811). By applying a minimum velocity function (815) to the grain size distribution A (811), the reservoir simulator generates a minimum velocity map E (820) of formation A. The minimum velocity map E (820) may be a grid of cells, where each cells includes a respective minimum velocity value describing the movement of sediment from a source location to the respective cell. By applying a kinetic energy gradient function (825) to the minimum velocity map E (820), various kinetic energy vectors (i.e., kinetic energy vector A (831), kinetic energy vector B (832), and kinetic energy vector C (833)) may be determined accordingly. The reservoir simulator then uses the kinetic energy vectors (831, 832, 833) as inputs to a sedimentary pathway mapping function (835) to produce a sedimentary pathway data A (891) that describes a set of sedimentary pathways based on grain size data.

In FIG. 8B, the reservoir simulator obtains a lithology distribution map A (812) and a relative relief map B (813) from the geological data (810) of a formation A (810), while also obtaining a depth map C (841) and a thickness map D (842) from seismic data (840) of formation A. The reservoir simulator uses the lithology distribution map A (812), the relative relief map B (813), the depth map C (841), and the thickness map D (842) as inputs to a decompaction function (855) to generate a 3D paleogeographic surface map E (850) of formation A. The 3D paleogeographic surface map (850) is used as an input to a potential energy gradient function (865) to determine various potential energy vectors (i.e., potential energy vector A (871), potential energy vector B (872), and potential energy vector C (873)). Finally, the reservoir simulator then uses the potential energy vectors (871, 872, 873) as inputs to a sedimentary pathway mapping function (835) to produce a sedimentary pathway data B (892) that describes a set of sedimentary pathways based on gravity. In FIG. 8C, the sedimentary pathway data A (891) and the sedimentary pathway data B (892) are combined to form an output sedimentary map C (893), which includes various sedimentary pathways (e.g., sedimentary pathways (894)).

Figure 9:
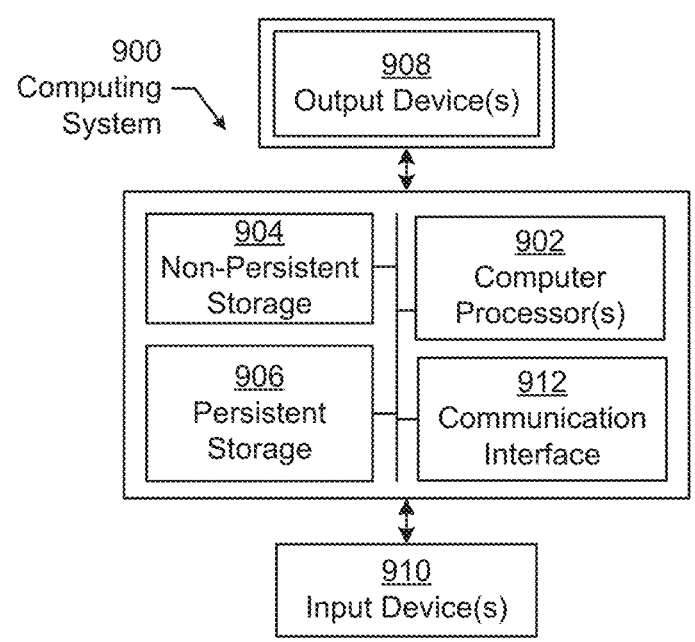
FIG. 9 shows a computing system in accordance with one or more embodiments.

Embodiments may be implemented on a computing system. Any combination of mobile, desktop, server, router, switch, embedded device, or other types of hardware may be used. For example, as shown in FIG. 9, the computing system (900) may include one or more computer processors (902), non-persistent storage (904) (e.g., volatile memory, such as random access memory (RAM), cache memory), persistent storage (906) (e.g., a hard disk, an optical drive such as a compact disk (CD) drive or digital versatile disk (DVD) drive, a flash memory, etc.), a communication interface (912) (e.g., Bluetooth interface, infrared interface, network interface, optical interface, etc.), and numerous other elements and functionalities.

The computer processor(s) (902) may be an integrated circuit for processing instructions. For example, the computer processor(s) may be one or more cores or micro-cores of a processor. The computing system (900) may also include one or more input devices (910), such as a touchscreen, keyboard, mouse, microphone, touchpad, electronic pen, or any other type of input device.

The communication interface (912) may include an integrated circuit for connecting the computing system (900) to a network (not shown) (e.g., a local area network (LAN), a wide area network (WAN) such as the Internet, mobile network, or any other type of network) and/or to another device, such as another computing device.

Further, the computing system (900) may include one or more output devices (908), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (902), non-persistent storage (904), and persistent storage (906). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system or group of computing systems described in FIG. 9 may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system (900) in FIG. 9. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 9, while performing one or more embodiments of the disclosure, may perform data comparison. Data comparison may be used to compare two or more data values (e.g., A, B). For example, one or more embodiments may determine whether $A>B$, $A=B$, $A\,!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 9 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 9 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 9. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method, comprising: obtaining, by a computer processor, geological data and seismic data regarding a geological region of interest,
wherein the geological data comprises grain size data that are acquired from a plurality of wells using a logging tool, a coring tool, or a plurality of drill cuttings from the plurality of wells;
generating, by the computer processor, a velocity map comprising a plurality of velocity attributes based on the grain size data,
wherein the grain size data comprises a grain size distribution of the geological region of interest, and
wherein a respective velocity attribute among the plurality of velocity attributes provides a measure of a kinetic energy that is required to move a sediment particle from a sedimentary source to a predetermined location along a sedimentary pathway;
determining, by the computer processor, a plurality of kinetic energy vectors using the velocity map;
determining, by the computer processor, a first plurality of sedimentary pathways using the plurality of kinetic energy vectors;
determining, by the computer processor, a topographical surface for the geological region of interest using the seismic data; determining, by the computer processor, a second plurality of sedimentary pathways using the topographical surface;
generating, by the computer processor, a plurality of output sedimentary pathways based on a combination of the first plurality of sedimentary pathways and the second plurality of sedimentary pathways; and
determining, by the computer processor, at least one hydrocarbon deposit in the geological region of interest using the plurality of output sedimentary pathways.

2. The method of claim 1, further comprising:
generating a depth map and a thickness map of a formation using the seismic data and/or the well data;
generating a paleogeographic surface using the depth map and thickness map; and
determining a plurality of potential energy vectors using the paleogeographic surface,
wherein the second plurality of sedimentary pathways are determined based on the plurality of potential energy vectors.

3. The method of claim 2,
wherein the paleogeographic surface is generated using a decompacted thickness and a relative relief map, and
wherein the decompacted thickness is based on the depth map, the thickness map, and a lithological distribution map based on the geological data.

4. The method of claim 1, further comprising:
determining a plurality of paleocurrent directions regarding the plurality of output sedimentary pathways,
wherein the plurality of paleocurrent directions are vectors that describe a difference between the plurality of output sedimentary pathways and a plurality of syndepositional topographical gradients.

5. The method of claim 1, further comprising:
determining a geological model of the geological region of interest using the plurality of output sedimentary pathways; and
determining an amount of hydrocarbon production for a reservoir using the geological model.

6. The method of claim 1, wherein the plurality of output sedimentary pathways are used to determine at least one seal within a reservoir.

7. The method of claim 1, further comprising:
determining a plurality of sedimentary sources within the geological region of interest; and
validating the plurality of output sedimentary pathways using the plurality of sedimentary sources.

8. A system, comprising:
a logging system coupled to a plurality of logging tools; and a reservoir simulator comprising a computer processor, wherein the reservoir simulator is coupled to the logging system, the reservoir simulator comprising functionality for:
obtaining geological data from the logging system and seismic data regarding a geological region of interest, wherein the geological data comprises grain size data that are acquired from a well using at least one logging tool among the plurality of logging tools,
generating a velocity map comprising a plurality of velocity attributes based on the grain size data,
wherein the grain size data comprises a grain size distribution of the geological region of interest, and
wherein a respective velocity attribute among the plurality of velocity attributes provides a measure of a kinetic energy that is required to move a sediment particle from a sedimentary source to a predetermined location along a sedimentary pathway;
determining a plurality of kinetic energy vectors using the velocity map;
determining a first plurality of sedimentary pathways using the plurality of kinetic energy vectors;
determining a topographical surface for the geological region of interest using the seismic data;
determining a second plurality of sedimentary pathways using the topographical surface;
generating a plurality of output sedimentary pathways based on a combination of the first plurality of sedimentary pathways and the second plurality of sedimentary pathways; and determining at least one hydrocarbon deposit in the geological region of interest using the plurality of output sedimentary pathways.

9. The system of claim 8, wherein the reservoir simulator further comprises functionality for:
generating a depth map and a thickness map of a formation using the seismic data and/or the well data;
generating a paleogeographic surface using the depth map and thickness map; and
determining a plurality of potential energy vectors using the paleogeographic surface, wherein the second plurality of sedimentary pathways are determined based on the plurality of potential energy vectors.

10. The system of claim 9,
wherein the paleogeographic surface is generated using a decompacted thickness and a relative relief map,
wherein the decompacted thickness is based on the depth map, the thickness map, and a lithological distribution map based on the geological data.

11. The system of claim 8, wherein the reservoir simulator further comprises functionality for:
determining a plurality of paleocurrent directions regarding the plurality of output sedimentary pathways,
wherein the plurality of paleocurrent directions are vectors that describe a difference between the plurality of output sedimentary pathways and a plurality of syndepositional topographical gradients.

12. The system of claim 8, wherein the reservoir simulator further comprises functionality for:

determining a geological model of the geological region of interest using the plurality of output sedimentary pathways; and determining an amount of hydrocarbon production for a reservoir using the geological model.

13. A non-transitory computer readable medium storing instructions executable by a computer processor, the instructions comprising functionality for:

obtaining geological data and seismic data regarding a geological region of interest, wherein the geological data comprises grain size data that are acquired from a plurality of wells using a logging tool, a coring tool, or a plurality of drill cuttings from the plurality of wells;

generating a velocity map comprising a plurality of velocity attributes based on the grain size data, wherein the grain size data comprises a grain size distribution of the geological region of interest, and wherein a respective velocity attribute among the plurality of velocity attributes provides a measure of a kinetic energy that is required to move a sediment particle from a sedimentary source to a predetermined location along a sedimentary pathway;

determining a plurality of kinetic energy vectors using the velocity map; determining a first plurality of sedimentary pathways using the plurality of kinetic energy vectors;

determining a topographical surface for the geological region of interest using the seismic data;

determining a second plurality of sedimentary pathways using the topographical surface;

generating a plurality of output sedimentary pathways based on a combination of the first plurality of sedimentary pathways and the second plurality of sedimentary pathways; and determining at least one hydrocarbon deposit in the geological region of interest using the plurality of output sedimentary pathways.

14. The non-transitory computer readable medium of claim 13, wherein the instructions further comprise functionality for:

generating a depth map and a thickness map of a formation using the seismic data and/or the well data;

generating a paleogeographic surface using the depth map and thickness map; and determining a plurality of potential energy vectors using the paleogeographic surface, wherein the second plurality of sedimentary pathways are determined based on the plurality of potential energy vectors.

15. The non-transitory computer readable medium of claim 14, wherein the paleogeographic surface is generated using a decompacted thickness and a relative relief map, and wherein the decompacted thickness is based on the depth map, the thickness map, and a lithological distribution map based on the geological data.

16. The non-transitory computer readable medium of claim 13, wherein the instructions further comprise functionality for:

determining a plurality of paleocurrent directions regarding the plurality of output sedimentary pathways, wherein the plurality of paleocurrent directions are vectors that describe a difference between the plurality of output sedimentary pathways and a plurality of syndepositional topographical gradients.

17. The non-transitory computer readable medium of claim 13, wherein the instructions further comprise functionality for:

determining a plurality of sedimentary sources within the geological region of interest; and validating the plurality of output sedimentary pathways using the plurality of sedimentary sources.

* * * * *